July 14, 1953 J. L. HEISTAND 2,645,440
HOLDING DEVICE FOR FISHING RODS AND FISHING POLES
Filed April 28, 1950

INVENTOR.
JOHN L. HEISTAND
BY
*E. m. Harrington*
ATTORNEY

Patented July 14, 1953

2,645,440

UNITED STATES PATENT OFFICE 2,645,440

HOLDING DEVICE FOR FISHING RODS AND FISHING POLES

John L. Heistand, Overland, Mo.

Application April 28, 1950, Serial No. 158,666

2 Claims. (Cl. 248—42)

This invention relates generally to holding devices for fishing rods and fishing poles and more specifically to holding devices of this type adapted for use in supporting fishing rods or fishing poles on banks of streams, the predominant object of the invention being to provide a holding device of the type referred to above which is of extremely simple construction, is capable of performing its intended function in a highly efficient manner, and is adapted to be folded into compact form for transportation and storage.

Figures 1, 2, 3:
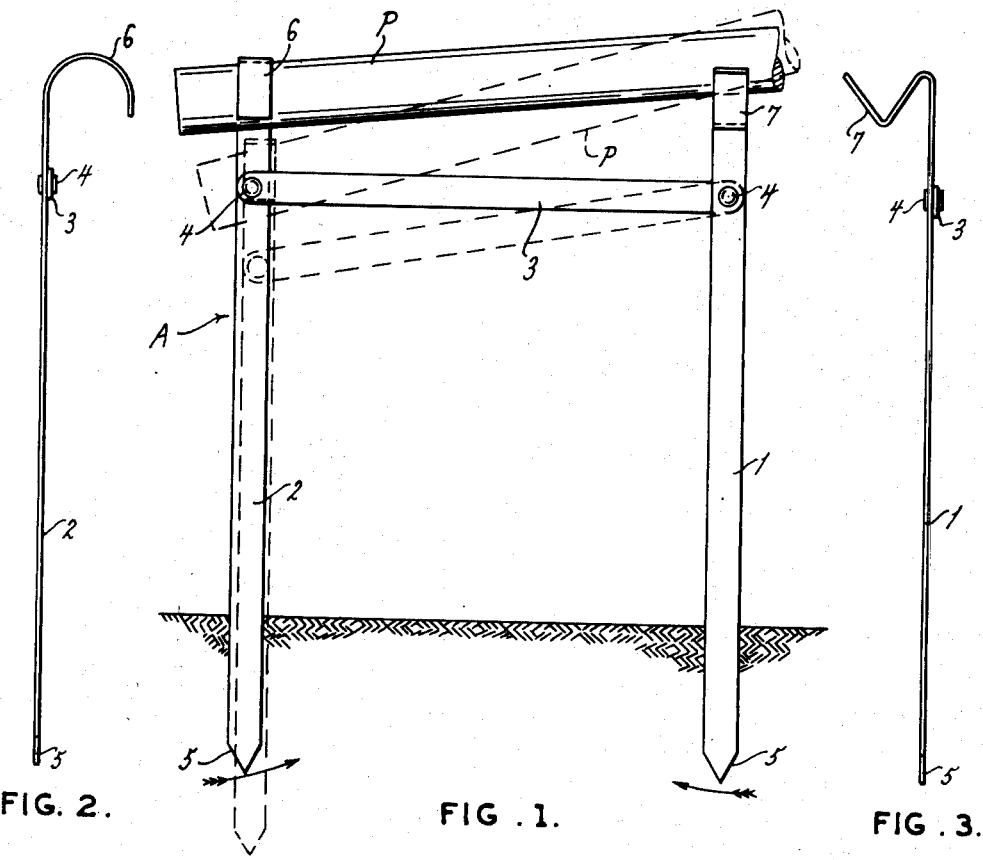
Fig. 1 is an elevational view of the improved fishing rod holder of this invention, showing same as it appears in use, a fishing rod or fishing pole being shown by broken lines.
Fig. 2 is an end elevational view looking at one end of the fishing rod holder.
Fig. 3 is an end elevation view looking at the opposite end of the fishing rod holder.

In the drawing, wherein is shown for purposes of illustration, merely, one embodiment of the invention, A designates the improved fishing rod or pole holding device generally. The device A comprises a pair of elongated members 1 and 2, which normally are disposed vertically, and a bar 3, which normally is disposed horizontally, said bar being attached adjacent to its opposite ends to said elongated members 1 and 2 by suitable pivot elements 4. The elongated members 1 and 2 are tapered at their lower ends, as indicated at 5, in order that they may be conveniently inserted in the ground. The elongated member 2 is provided at its upper end with a hook-shaped portion 6 that opens downwardly, as is shown to good advantage in Fig. 2, while the elongated member 1 is provided at its upper end with a crotch portion 7 which is of substantially V-shaped configuration, as is shown to good advantage in Fig. 3. It will be noted that the elongated bar 3 is pivotally attached at one of its ends to one face of the elongated member 1 while said bar is attached at its other end to the opposite face of the elongated member 2. This arrangement is shown to good advantage in Fig. 4 and it is important in connection with the folding of the device, as will presently appear herein.

In the use of the improved fishing rod or pole holding device of the present invention, the lower portions of the elongated members 1 and 2 are forced into the ground of the bank of a stream to a sufficient depth to firmly support the device in an upright position for use, as is shown in Fig. 1; and it is important to note that the elongated members 1 and 2 may be forced into the ground to relatively different depths in order that the fishing rod or pole may be supported at various desired angles relative to the ground and the surface of the water of the stream. This is shown in Fig. 1 wherein the fishing rod or pole P is shown in two different angle positions by broken lines, it being necessary, merely, to force the elongated members 1 and 2 of a device A into the ground to various depths to support the fishing rod or pole in different angular positions. When the fishing rod or pole supporting device has been arranged in position for use, as explained above, the fishing rod or pole P is applied thereto by placing a portion of the fishing rod or pole in the crotch portion 7 of the elongated member 1, and by arranging the butt end portion of the fishing rod or pole beneath the hook-shaped portion 6 of the elongated member 2. When so supported the overhanging, forwardly extended portion of the fishing rod or pole will keep a portion of the fishing rod or pole in firmly seated relation with respect to the crotch portion 7 of the member 1 and the butt end porttion of the fishing rod or pole in firm contact with the inner face of the hook-shaped portion 6 of the member 2. An important feature of the device of the present invention is that when the two elongated members 1 and 2 are forced in the ground to support the device, the tendency for the wind, acting against the fishing rod or pole, to rotate the fishing rod holding device, is eliminated.

Figure 4:
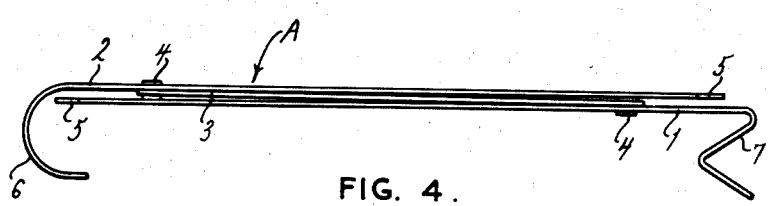
Fig. 4 is a plan view showing the fishing rod holder as it appears when folded into compact form.

When the fishing rod or pole holding device of this invention is not in use it may be folded into a compact form so that it will occupy very little space, for instance, in a tackle box. The folding of the device is accomplished by swinging the elongated members 1 and 2 about their pivots 4 in the directions indicated by the arrows in Fig. 1 until said members are disposed parallel, as is shown in Fig. 4, with the bar 3 interposed between said members in parallelism therewith.

I claim:

1. A holding device for fishing rods and poles comprising a pair of elongated members, a bar pivotally connected adjacent to its opposite ends to said elongated members, and means at ends of said elongated members for supporting a fishing rod or fishing pole, the last-mentioned means comprising an upper end portion of one of said elongated members in the form of a crotch in which a portion of a supported fishing rod or fishing pole may rest and an upper end portion of the other of said elongated members in the form of a hook which is adapted to extend over a portion of a supported fishing rod or fishing pole, one of said elongated members being disposed for pivotal movement at one face of said bar and the other of said elongated members being disposed for pivotal movement at the opposite face of said bar.

2. A holding device for fishing rods and poles comprising a pair of elongated members, a bar pivotally connected adjacent to its opposite ends to said elongated members, and means at ends of said elongated members for supporting a fishing rod or fishing pole, the last-mentioned means comprising an upper end portion of one of said elongated members in the form of a V-shaped crotch in which a portion of a supported fishing rod or fishing pole may rest and an upper end portion of the other of said elongated members in the form of a hook which is adapted to extend over a portion of a supported fishing rod or fishing pole, one of said elongated members being disposed for pivotal movement at one face of said bar and the other of said elongated members being disposed for pivotal movement at the opposite face of said bar, and the lower end portions of said elongated members being tapered so as to facilitate insertion thereof into the ground.

JOHN L. HEISTAND.

References Cited in the file of this patent

UNITED STATES PATENTS

| Number | Name | Date |
|---|---|---|
| 1,876,478 | Van Duzer | Sept. 6, 1932 |
| 2,466,166 | Fischer | Apr. 5, 1949 |
| 2,492,323 | Roell | Dec. 27, 1949 |
| 2,530,265 | Phalen | Nov. 14, 1950 |
| 2,541,146 | Bahr | Feb. 13, 1951 |
| 2,543,539 | Dusatko | Feb. 27, 1951 |